(12) United States Patent
Ledbetter et al.

(10) Patent No.: US 8,465,614 B2
(45) Date of Patent: Jun. 18, 2013

(54) PROCESS FOR RECYCLING WASTE FILM AND PRODUCT MADE THEREFROM

(75) Inventors: Marshall Dean Ledbetter, Greenville, SC (US); Kathleen L. Trojan, Simpsonville, SC (US)

(73) Assignee: Mitsubishi Polyester Film, Inc., Greer, SC (US)

( * ) Notice: Subject to any disclaimer, the term of this patent is extended or adjusted under 35 U.S.C. 154(b) by 9 days.

(21) Appl. No.: 13/005,171

(22) Filed: Jan. 12, 2011

(65) Prior Publication Data

US 2011/0168325 A1  Jul. 14, 2011

Related U.S. Application Data

(60) Provisional application No. 61/294,625, filed on Jan. 13, 2010.

(51) Int. Cl.
   *C09J 5/00* (2006.01)
   *B29C 47/78* (2006.01)
   *C08L 67/02* (2006.01)

(52) U.S. Cl.
   USPC ............ 156/244.11; 264/37.32; 524/605

(58) Field of Classification Search
   USPC .................................. 156/244.11
   See application file for complete search history.

(56) References Cited

U.S. PATENT DOCUMENTS

| | | | |
|---|---|---|---|
| 3,586,647 A | 6/1971 | Kremer | |
| 3,634,359 A | 1/1972 | Breitschaft et al. | |
| 3,657,388 A | 4/1972 | Schweizer et al. | |
| 3,953,404 A | 4/1976 | Borman | |
| 3,969,324 A | 7/1976 | Berkau et al. | |
| 4,092,458 A | 5/1978 | Hoffman | |
| 4,143,001 A | 3/1979 | Raab et al. | |
| 4,165,420 A | 8/1979 | Rinehart | |
| 4,255,295 A | 3/1981 | Regnault et al. | |
| 4,374,975 A | 2/1983 | Duh | |
| 4,392,804 A | 7/1983 | Pushee et al. | |
| 4,532,319 A | 7/1985 | Wendling | |
| 4,755,587 A | 7/1988 | Rinehart | |
| 4,876,326 A | 10/1989 | Rinehart | |
| 4,977,196 A | 12/1990 | Scannapieco | |

(Continued)

FOREIGN PATENT DOCUMENTS

| | | |
|---|---|---|
| EP | 1 418 195 A1 | 5/2004 |
| EP | 1 612 237 A1 | 1/2006 |

(Continued)

OTHER PUBLICATIONS

Solid state polycondensation, http://www.starlinger.com, at least as early as Dec. 15, 2009, 6 pages.

(Continued)

*Primary Examiner* — Philip Tucker
*Assistant Examiner* — Vicki Wu
(74) *Attorney, Agent, or Firm* — Dority & Manning, P.A.

(57) ABSTRACT

The present disclosure is directed to a process for recycling film materials, and is particularly directed to collecting spent release liners for labels and constructing new release liner stock from the spent materials. In order to use the waste film, the film is subjected to a process for increasing the intrinsic viscosity. In addition, a coloring agent may be incorporated into the film in order to mask yellowing. In one embodiment, a multilayered composite film is formed.

25 Claims, 2 Drawing Sheets

U.S. PATENT DOCUMENTS

| | | | |
|---|---|---|---|
| 5,225,130 | A | 7/1993 | Deiringer |
| 5,391,582 | A * | 2/1995 | Muschiatti et al. ............. 521/81 |
| 5,407,624 | A | 4/1995 | Engh, III et al. |
| 5,408,035 | A | 4/1995 | Duh |
| 5,449,701 | A | 9/1995 | Duh |
| 5,955,569 | A | 9/1999 | Dujari et al. |
| 6,020,412 | A * | 2/2000 | Muschelewicz et al. ..... 524/296 |
| 6,056,901 | A | 5/2000 | Hamatani et al. |
| 6,376,067 | B1 | 4/2002 | Heberger et al. |
| 7,229,581 | B2 | 6/2007 | Kern et al. |
| 7,358,328 | B2 | 4/2008 | Fellinger et al. |
| 7,700,015 | B2 | 4/2010 | Kern et al. |
| 2002/0136880 | A1 | 9/2002 | Murschall et al. |
| 2003/0012937 | A1 | 1/2003 | Murschall et al. |
| 2003/0161999 | A1* | 8/2003 | Kannankeril et al. ........ 428/178 |
| 2004/0130059 | A1 | 7/2004 | Kern et al. |
| 2006/0004114 | A1* | 1/2006 | Kern et al. ...................... 521/48 |

FOREIGN PATENT DOCUMENTS

| | | |
|---|---|---|
| EP | 1 785 443 A1 | 5/2007 |
| EP | 1785443 A1 * | 5/2007 |
| WO | WO 94/13474 | 6/1994 |

OTHER PUBLICATIONS

JP9090874 Abstract, Thomson Scientific, London, GB, XP002631812, 2 pages.

JP2000063557 Abstract, Thomson Scientific, London, GB, XP002631813, 2 pages.

Article: "Release liner waste management—more than a burning issue," H. Haplert, Packaging Printing & Converting, Jul. 1992, pp. 25 & 27, XP009146986.

International Search Report, PCT/US2011/020943, mailed Apr. 18, 2011.

* cited by examiner

PROCESS FOR RECYCLING WASTE FILM AND PRODUCT MADE THEREFROM

RELATED APPLICATIONS

The present application is based upon and claims priority to U.S. Provisional Patent application No. 61/294,625 filed on Jan. 13, 2010.

BACKGROUND

Many laminate materials, such as labels, are initially placed on a release liner prior to application to a product or to another substrate. The release liners can be made from polymer films. For instance, in one embodiment, the release liner may comprise a silicone-coated polyester film. Such silicone-coated films are commonly employed as release liners for labels, pressure sensitive tapes, decorative laminates, transfer tapes, and the like. The silicone coating on the base polymer film allows the adhesive face of the laminate material to be easily removed from the film prior to use.

Release liners made from polymer films, such as polyester films, have become commercially successful and are used in great quantities. Unfortunately, however, the release liners made from polymer films are typically only used once and then discarded. To date, no entity has been commercially successful in recycling the used liner material. In fact, most spent release liner ends up in landfills. It is estimated that over 35 million pounds per year of spent release liner enters the waste stream only after a single use. The above numbers are especially troubling in that the release liner is only a collateral material used to temporarily hold a label or other laminate material and is not itself incorporated in to the resulting product.

Although there is a need in the art to develop a way to recycle or to reuse spent release liner, various obstacles exist that have made reusing spent release liner problematic. For instance, spent release liner, especially liner made from polyester film, is not well suited for being reprocessed and formed back into a film product. The polyester contained in the release liner, for instance, has a tendency to degrade and possess inferior optical and mechanical properties making it very difficult to reuse the material in significant quantities. For instance, polyester film has a tendency to absorb moisture causing a substantial loss of molecular weight as indicated by a measured decrease in intrinsic viscosity. The molecular weight of the polymer decreases to an extent that the polymer can no longer be processed in commercial equipment and reformed into a film. In addition, reprocessed polyester tends to undergo significant yellowing and has increased haze making the resulting film undesirable to customers.

Another problem in recycling spent release liner is the ability to collect the material once it has been used. Release liner, for instance, goes through an extended supply chain making it difficult for the material to be recovered. For instance, the polyester film is typically manufactured by a film maker and then sent to a laminator. The laminator applies a laminate facestock material to the film. The laminate material is then sent to a printer and converter who then prints and diecuts the labels on the release liner. From the printer and the converter, the laminate material is then sent to an end user who typically has no relationship to the original film maker. The end user removes the labels from the release liner and discards the liner to a landfill or otherwise is sold as scrap material and exported to developing countries. Further, even if the film maker wanted to collect the spent release liner and had access to the material, the used release liner is typically combined with other industrial waste and scraps.

In view of the above, a need currently exists for a process for collecting spent release liner and for a process to reuse the liner that overcomes the above noted problems and drawbacks.

SUMMARY

In general, the present disclosure is directed to a process for collecting spent release liner and recycling the liner in a manner that allows the spent liner to be used in constructing new films, particularly new release liner. The present disclosure is also directed to a release liner product constructed at least in part, from spent and used liner stock. In one embodiment, for instance, the release liner product may comprise a multilayered film containing spent liner stock in a middle layer and also containing a coloring agent that provides the film with a unique appearance and masks any yellowing that the film may undergo once formed.

In one embodiment, for instance, the process of the present disclosure includes first converting spent and used liner stock into chip form. As used herein, "spent liner stock" refers to release liner film that was formed and combined with a laminate material. Spent liner stock more particularly refers to the resulting used release liner film after the laminate material has been removed. Thus, spent liner stock is to be differentiated from "reclaimed" liner stock, which is liner stock that represents scraps accumulated during manufacture of the film such as start up waste, bead and slitter trim, and reject film.

Once the spent liner stock has been converted into chip form, the intrinsic viscosity of the liner stock particles is increased to at least about 0.58, such as at least about 0.59, such as at least about 0.60. For instance, in one embodiment, the intrinsic viscosity of the liner stock chip is increased to from about 0.58 to about 0.7, such as from about 0.6 to about 0.64. In one particular embodiment, for instance, the intrinsic viscosity of the liner stock chip is increased to from about 0.61 to about 0.63. The manner in which the intrinsic viscosity of the liner stock particles is increased can depend upon the particular application. For example, in one embodiment, the intrinsic viscosity is increased through a solid state polymerization process. In an alternative embodiment, a chain extender can be added to the liner stock chip for increasing its intrinsic viscosity.

In accordance with the present disclosure, a coloring agent is added to the spent liner stock and the spent liner stock is then heated and extruded into a film. The resulting film, for instance, may be used as a new liner stock product. In this regard, the film may have a release surface configured to function as a release liner for a laminate material.

As described above, a coloring agent is added to the liner stock as it is made into a film. The coloring agent can have any suitable color capable of masking any yellowing of the film that may occur later. In one embodiment, for instance, the coloring agent may comprise a blue or a green coloring agent. For instance, in one embodiment, the coloring agent may comprise a pigment (contained in a dispersion) and may be present in the film in an amount from about 0.01% to about 1% by weight.

In one embodiment, the film formed from the spent liner stock may comprise a multilayered extruded film. The multilayered film may include at least a middle layer positioned between a first outer layer and a second outer layer. The spent liner stock may be completely contained within the middle layer.

In one embodiment, for instance, the first outer layer and the second outer layer of the multilayered film may comprise a virgin polymer material, such as virgin polyethylene terephthalate. The middle layer, on the other hand, may comprise the spent liner stock combined with virgin or reclaimed polyethylene terephthalate. The middle layer may contain from about 1% by weight to about 100% by weight spent liner stock. For example, the middle layer may contain the spent liner stock in an amount of at least about 20% by weight, such as in an amount of at least about 40% by weight, such as in an amount of at least about 60% by weight.

In one embodiment of a multilayered film made in accordance with the present disclosure, the first outer layer and the second outer layer may comprise from about 5% to about 15% by weight of the film. The middle layer, on the other hand, may comprise from about 70% to about 90% by weight of the film.

The film made according to the present disclosure includes a release surface configured to function as a release liner for a laminate material. In one embodiment, the release surface may be formed by applying a release coating to the film. For instance, the release coating may comprise a silicone coating. In one embodiment, the process further includes the step of applying a laminate material to the release surface of the film for forming a laminate.

Of particular advantage, the spent release liner can be recycled numerous times during the process of the present disclosure. Specifically, the spent liner stock can be collected, processed to increase its intrinsic viscosity, and then used to form new liner stock which, in turn, can be collected and processed over and over for creating more liner stock product.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
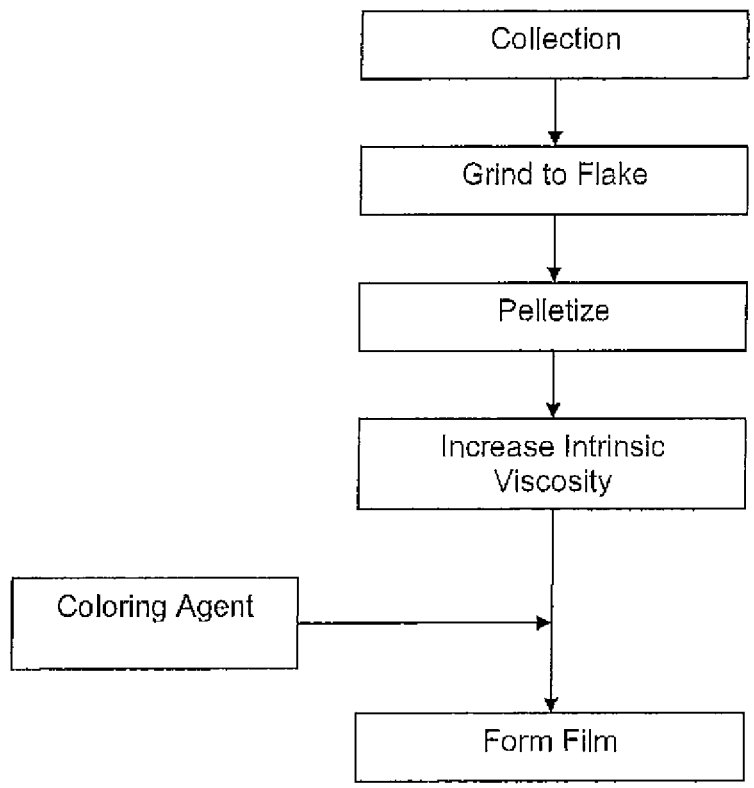
FIG. 1 is a plan view of a flow chart illustrating one embodiment of a process made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

In general, the present disclosure is directed to a process for recycling polymers, particularly polyester polymers. In one embodiment, for instance, the process is directed to collecting spent or waste polyester film, increasing the molecular weight of the polyester film, and then reprocessing the spent film to form a new film product. During formation of the new film product, a coloring agent can be incorporated into the product for masking any imperfections or yellowing that may occur before or during use of the film.

In one particular embodiment, for instance, the process of the present disclosure is specifically directed to collecting spent liner stock. The spent liner stock may have been used as a release layer for a laminate material, such as a label. The spent liner stock can be collected and used to make a new liner stock product. Of particular advantage, the process of the present disclosure allows for the recycling of the same polymer over and over. In this manner, the process is environmentally friendly and can be used to significantly reduce the amount of polymer waste entering the solid waste stream.

The present disclosure is also directed to a composite film product that can be formed from the recovered spent liner stock. In one embodiment, for instance, a multilayered polyester film can be formed through coextrusion. The surface plays a role in the release performance and therefore product performance is preserved at high levels of spent liner content due to virgin outside layers. The spent liner stock may be contained alone or in combination with another polymer in a middle layer of the film. Various coatings can be applied to the film for providing a release layer for a laminate material.

Referring to FIG. 1, for instance, one embodiment of a process in accordance with the present disclosure is shown. As illustrated, the first step in the process is to collect the spent or waste liner stock from the user. In one embodiment, for instance, the liner stock may be used as a release layer for labels. Once removed from the liner stock, for instance, the labels may be applied to a product container, such as a beverage container. Currently, once the labels are removed from the liner stock, the liner stock is discarded into the solid waste stream and is not separated from other waste materials.

In accordance with the present disclosure, in one embodiment, a collection device and/or collection program may be implemented at the liner stock user's facility in order to collect the spent liner stock without significant commingling with other waste materials. For example, in one embodiment, a collection device may be placed or located at the liner stock user's facility that is for collecting the spent liner stock for reprocessing and reuse. The collection device, for instance, may comprise a device that automatically collects the spent liner stock as the labels are removed. The collection device, for instance, may comprise a container that is removed periodically when filled with the spent liner stock and replaced with an empty collecting device.

Once the spent liner stock is collected, the spent film may be reduced in size to form spent liner stock particles or chips. In one embodiment, the spent liner stock may be fed to a grinding device that reduces the liner stock into flakes. In general, any suitable grinding device or cutting device may be used to reduce the size of the polymer film.

Prior to further processing, the spent liner stock particles may be subjected to various processes for removing any contaminants. For example, in one embodiment, the spent liner stock flakes can be washed in an aqueous or non-aqueous solution. For instance, in one embodiment, the flakes can be washed in water or in a water plus detergent solution in order to remove dirt or otherwise clean the flakes.

In an alternative embodiment, the flakes may be washed in a solution capable of removing adhesive coatings and/or paper labels. For instance, the flakes may be washed in an alkaline solution, such as a solution containing caustic soda. In yet another embodiment, the flakes may be washed in a solvent, such as a hydrocarbon solvent.

In addition to or instead of a washing step, the spent liner stock flakes can also be subjected to various other processes and methods for removing impurities. For instance, in one embodiment, the flakes can be fed through a flotation process or sedimentation process by which heavier materials are removed. In other embodiments, the flakes may be fed through a cyclone to also remove heavier materials or may be feed through an electrostatic separating device and/or a magnetic separating device.

It should be understood, however, that in some embodiments no pretreatment or washing of the spent liner stock flakes is necessary. For example, incorporating a collecting device as described above that captures the spent liner stock immediately after use can significantly reduce the presence of any contaminants.

As shown in FIG. 1, once the spent liner stock has been ground into chips or flakes, in one embodiment, the flakes can optionally be pelletized. In particular, the flakes can be fed to an extruder, melted, and converted into a product having a different size, such as chips in the form of pellets. It should be understood, however, that pelletizing the chips may be unnecessary in certain applications.

Once the spent liner stock is ground into flakes and optionally pelletized, the resulting chips are then subjected to a process that increases the molecular weight of the polymer and also increases the intrinsic viscosity of the polymer. Once polyester films are produced, for instance, the films have a tendency to absorb water. The absorbed water can cause a substantial decrease in molecular weight and therefore a substantial decrease in intrinsic viscosity. The decrease in intrinsic viscosity, in turn, renders the polymer difficult to melt and reprocess on standard film making equipment. Thus, in order to be able to collect the spent liner stock and convert it into new liner stock, the intrinsic viscosity of the spent liner stock typically needs to be increased.

For example, collected spent liner stock can have an intrinsic viscosity of less than about 0.56. In accordance with the present disclosure, the intrinsic viscosity of the spent liner stock, in one embodiment, can be increased to greater than about 0.58, such as greater than about 0.59, such is greater than about 6.0. For instance, in one embodiment, the spent liner stock chip or flakes are subjected to a process that increases the intrinsic viscosity to a range from about 0.58 to about 0.70, such as from about 0.6 to about 0.64, such as from about 0.61 to about 0.63.

Various different techniques and methods may be used in order to increase the molecular weight and the intrinsic viscosity of the spent liner stock chips. In one embodiment, for instance, a chain extender may be incorporated into the polymer. The chain extender, for instance, may comprise pyromellitic dianhydride (PMDA). The chain extender becomes incorporated into the polymer chain for increasing the molecular weight and the intrinsic viscosity of the polymer. In one embodiment, for instance, the chain extender can be combined with the spent liner stock chips during the formation of a new film. The chain extender may be added to the spent liner stock chips in an amount less than about 0.5% by weight, such as in an amount less than about 0.1% by weight. For instance, in one embodiment, the chain extender may be combined with the spent liner stock chips in an amount from about 0.01% to about 0.1% by weight.

In an alternative embodiment, the intrinsic viscosity of the polymer chips may be increased through a solid state polymerization process, also known as a solid state polycondensation process. During solid state polymerization, the spent liner stock particles or chips are introduced into a reactor, such as a devolatizer. Within the reactor, the chips are subjected to heat and vacuum. In one embodiment, an inert gas is introduced into the reactor for maintaining an inert environment. The chips are maintained in the reactor at a temperature and at a time sufficient to cause polycondensation. In particular, while in the reactor, residual catalyst contained in the polymer causes a reaction to occur, which causes the polymer to polymerize. During the reaction, water and glycol are released by the polymer ultimately resulting in the molecular weight of the polymer to be increased.

In one embodiment, for instance, the reactor is maintained at a vacuum of from about 0.5 to about 5 mbar, at a temperature of from about 210° C. to about 230° C. and for a time of from about 4 to about 8 hours.

Solid state polymerization processes, for instance, may be disclosed in the following patents: U.S. Pat. Nos. 3,586,647; 3,657,388; 3,969,324; 3,953,404; 4,092,458; 4,165,420; 4,255,295; 4,532,319; 4,755,587; 4,876,326; 4,977,196; 5,225,130; 5,407,624; 5,408,035; 5,449,701; 5,955,569; 6,056,901; and 7,358,328, which are all incorporated herein by reference. In the above patents, some processes are directed to increasing the molecular weight of prepolymers while other processes disclose processes where the polymer is reduced to a molten state at some point in the process. Solid state polymerization as used in the present disclosure, however, refers to increasing the intrinsic viscosity of the polymer chips without the chips melting or significantly changing in size or shape.

In one particular embodiment, solid state polymerization of the spent liner stock chips is initiated by first introducing the chips into a preheating container and preheating the chips prior to conveying the chips into a heat treatment container. The preheating container can be operated under vacuum, such as at a pressure of between about 0.1 mbar and about 10 mbar. In the preheating container, the polymer chips can be heated to a temperature of from about 160° C. to about 180° C. while being agitated by continuous stirring.

From the preheating container, the polymer chips are then introduced into a heat treatment container. The heat treatment container can also be maintained at a vacuum at the same pressures as described above. The chips can remain in the heat treatment chamber for a time of from about 3 hours to about 10 hours or until the molecular weight of the polymer has been increased to a sufficient level.

As shown in FIG. 1, once the intrinsic viscosity of the spent liner stock chips have been increased to a desired level, the chips or particles are then fed through an extruder and formed into a film. Even though the molecular weight and the intrinsic viscosity of the polymer have been increased, however, the used polymer still has a tendency to substantially yellow and have poor haze properties when extruded into a new film. In this regard, as shown in FIG. 1, a coloring agent is added to the polymer particles during formation of the film. More particularly, a coloring agent is selected that is capable of masking any yellowing of the film that may occur without adversely impacting the properties of the resulting film product. Thus, factors to be considered in selecting the coloring agent include the particular color that is incorporated into the film, the amount of coloring agent needed in order for the film to exhibit a particular color, and the compatibility of the coloring agent with the polymer. Another factor to consider is the effect the coloring agent has on the aesthetic properties of the resulting film, thus rendering the film more desirable to a customer.

In selecting a coloring agent, for instance, generally white pigments and black pigments are to be avoided. More desirable colors, on the other hand, comprise colors that blend well with yellow. Such colors include, for instance, green, blue and red.

In one particular embodiment, for instance, a green or blue coloring agent is selected that produce a green colored film. The coloring agent for instance, may be combined with the polymer during the extruding process in the form of a solution or dispersion. Suitable coloring agents that may be incorporated into the film are commercially available from ColorMatrix Corporation.

The amount of coloring agent added to the spent liner stock chips during formation of the film can vary depending upon various factors. In one embodiment, the coloring agent is added in an amount less than 2% by weight of the resulting film. For instance, the coloring agent can be added in an amount from about 0.01% to about 1% by weight.

In one embodiment, the coloring agent may be added to the spent liner stock chips in an amount sufficient for the resulting film to have a yellowness index of less than about 1.5, such as less than about 1.25, such as even less than about 1. The yellowness index is determined according to ASTM Test No. D1925.

As described above, in one embodiment, a green or blue coloring agent may be selected that produces a green colored film. Producing a green colored film may provide various benefits and advantages. For instance, the green color of the film symbolizes the environmentally-friendly nature of the film. In particular, the process of the present invention produces a sustainable product that reduces waste fed to the solid waste stream. A green colored product conveys these attributes of the film to customers and users.

Colorizing the film may also have various advantages and benefits when once again collecting the film after use. Colorizing the film, for instance, may make it easier to separate the film from other contaminants during the collection process. The color of the film may also prevent others from discarding other wastes with the film during the collection process.

In addition to providing the resulting film with a color, the coloring agent can also contain various other ingredients. For instance, the coloring agent can include other additives, such as chain extenders, antistatic additives, mold release agents, and UV stabilizers.

In forming a new film product in accordance with the present disclosure, the film can be made entirely from the recycled spent liner stock or may be comprised of the recycled spent liner stock in combination with one or more virgin polymers. In addition, the film may be a single layer film or may comprise a multilayered film.

The process of the present disclosure may be applicable to various different types of polymeric materials. For instance, the process of the present disclosure may be applied to recycling films made from polyamides, polyolefins, polycarbonates, and the like. The present disclosure, however, is particularly applicable to recycling films made from polyester, such as polyethylene terephthalate, polyethylene naphthalate, polybutylene terephthalate, or to copolyesters such as polyethylene terephthalate isophthalate.

Figure 2:
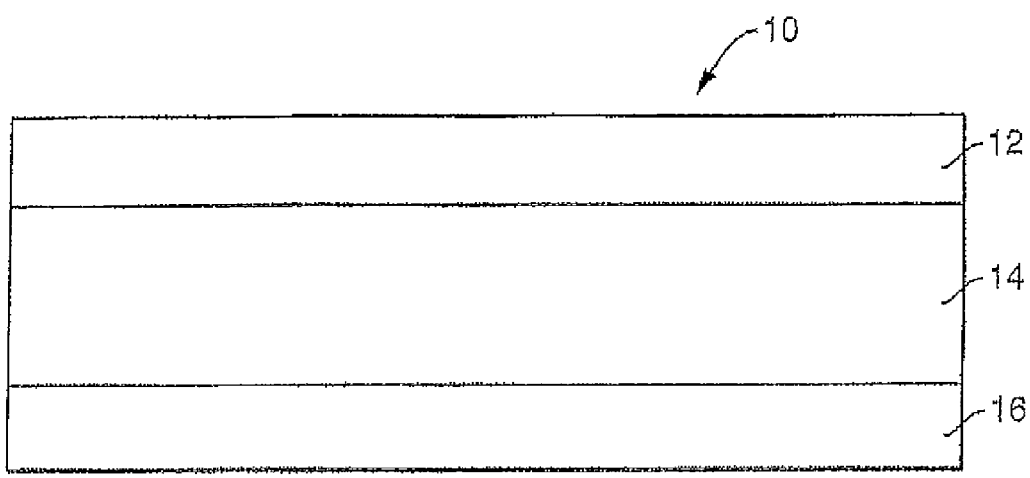
FIG. 2 is a cross-sectional view of one embodiment of a multilayered film made in accordance with the present disclosure.

In one embodiment, the spent liner chip is used to form a new liner stock product. The new liner stock product may comprise a multilayered film as shown in FIG. 2. FIG. 2, for instance, illustrates a cross section of one embodiment of a composite film 10 made in accordance with the present disclosure. The composite film 10 includes a middle film layer 14 positioned in between a first outer film layer 12 and a second outer film layer 16. It should be understood, however, that the composite film 10 may contain only 2 layers or may contain more than 1 middle layer. In one embodiment of the present disclosure, the spent liner stock is contained exclusively within the middle layer 14. In particular, since the properties of the spent liner stock chip may vary, especially with respect to color, yellowing and haze, placing the spent liner stock in the middle layer of the composite film may minimize the variable properties, including surface roughness.

Although the construction of the various layers may vary depending upon the particular application, in one embodiment, the first outer layer 12 and the second outer layer 16 may comprise a virgin polymer, such as a virgin polyester polymer. The outer layers 12 and 16 may each comprise from about 5% to about 15% by weight of the film. For instance, in one embodiment, the outer layers may comprise from about 10% to about 12% by weight of the film.

The middle layer, on the other hand, may comprise from about 70% to about 90% by weight of the film, such as from about 75% to about 85% by weight of the film. The middle layer 14 may be made exclusively from the spent release liner chip or may comprise a combination of the spent liner stock chips combined with other polymers. In one embodiment, for instance, the middle layer 14 may comprise the spent liner stock in an amount from about 1% to about 100% by weight, such as from about 35% to about 55% by weight. The remaining portion of the middle layer 14 may comprise virgin polyester polymer or may comprise reclaimed polyester polymer.

In order to form the composite film of the present disclosure, in one embodiment, the film layers can be coextruded together. For example, each of the polymers or polymer blends used to form the layers can be melted separately and then extruded together as a single, but layered, sheet onto a polished revolving casting drum to form a cast multilayer film. The composite film is quickly cooled and then stretch oriented in one or more directions to impart strength and toughness to the composite film. The composite film, for instance, can be uniaxially stretched or biaxially stretched. Generally, stretching occurs in a temperature range from about the second order transition temperature of the polyester polymer to below the temperature at which the polymer softens and melts. Where necessary, the composite film can also be heat treated after stretching to "lock-in" the properties of the polyester film layer by further crystallizing the film. The crystallization imparts stability and good tensile properties to the composite film. Such heat treatment for a polyester film layer is generally conducted at a temperature of from about 190° C. to about 240° C. For instance, in one embodiment, the composite film can be exposed to heat of from about 215° C. to about 225° C. for a period of about 1 second to about 20 seconds, such as from about 2 seconds to about 10 seconds.

The amount the film is stretched prior to being heat treated can depend upon various factors. When uniaxially stretched, the film can be stretched in one direction (such as the machine direction or the cross machine direction) in an amount from about 1 times to about 4 times its original length, such as from about 3 times to about 4 times its original length. When biaxially stretched, the film can then be stretched in a perpendicular direction in an amount from about 1 times to about 4 times its original length, such as from about 3 times to about 4 times its original length.

When coextruding the film layers together, the polymer resin used to form the layers can have an intrinsic viscosity of from about 0.6 IV to about 0.7 IV. For example, the intrinsic viscosity of the polymer resin for each layer can be from about 0.61 IV to about 0.63 IV.

The final thickness of the composite film can vary depending upon various factors and circumstances, such as the process used to form the film and the end use application. In general, for instance, the composite film can have a thickness of from about 0.5 mil to about 7 mils or greater. In one particular application, the composite film can have a thickness of from about 0.8 mils to about 2 mils, such as from about 0.8 mils to about 1.8 mils. The middle film layer 14, for instance, can generally have a thickness of from about 0.5 mils to about 1.3 mils in the above embodiment.

In addition to the polymer layers as shown in FIG. 2, the composite film 10 can include various treatments and coatings. For instance, in one embodiment, the composite film 10 can include a release surface configured to function as a release liner for a laminate material. The release surface can be constructed in different ways and using different techniques. In one embodiment, for instance, the release surface can be formed by applying a coating to a surface of the composite film.

In one embodiment, for instance, the composite film may include a silicone coating. The silicone coating can be, for instance, a solvent cross-linkable type silicone coating, a solvent-free silicone coating, a solvent-free ultraviolet or electron beam curable silicone coating, or an aqueous based silicone coating. In one embodiment, the silicone coating comprises a thermal cured silicone coating that may be platinum catalyzed and may be formed from a silicone emulsion.

In one embodiment, a silicone coating composition may be applied to the film while the film is being formed. For instance, the coating composition may be applied while the film is being biaxially stretched. If desired, prior to the application of the silicone composition, the surface of the film may be subjected to a corona treatment.

In addition to a release coating, a slip control coating may also be applied to the composite film. The slip control coating, for instance, may be applied to a side of the film opposite the release coating.

The slip control coating, for instance, may comprise a binder, a coupling agent, a wicking aid, and/or a surface active agent. The binder may comprise a copolyester formed from a sulfomonomer, isophthalic acid and an aliphatic dicarboxylic acid. Alternatively, the binder may comprise a polyvinyl pyrrolidone. The coupling agents may comprise a silane, while the wicking agent may comprise oxide particles, such as silicon dioxide particles.

The present disclosure may be better understood with reference to the following examples.

EXAMPLE NUMBER 1

A multilayered composite film was made in accordance with the present disclosure and compared to other multilayered films for the purpose of comparing various properties.

The film made in accordance with the present disclosure (Sample Number 1) comprised a three layer film. The middle layer had a thickness of 17 microns and was made from 100% by weight spent liner stock. The outer layers each had a thickness of three microns and comprised 100% by weight virgin polyethylene terephthalate.

For purposes of comparison, a three layered film was constructed having the same thicknesses described above that was made entirely from virgin polyethylene terephthalate (Sample Number 2)

A third composite film was also produced (Sample Number 3) which also contained three layers having the above described thicknesses. The two outer layers comprised 100% by weight virgin polyethylene terephthalate. The middle layer, however, was comprised of 100% by weight reclaimed liner stock.

The above three films were tested for gels, haze, yellowness, and brightness. Haze was tested according to ASTM Test No. D1003. The yellowness index and the brightness index were tested according to ASTM Test No. D1925 and the intrinsic viscosity was tested according to ASTM Test No. D4603. The gel test below was based on a visual inspection. The following results were obtained:

|  | Sample No. 1 | Sample No. 2 | Sample No. 3 |
|---|---|---|---|
| Gels <1000µ (per 1000 ft$^2$) | 3 | 1 | 0 |
| Gels 1000-4000µ (per 1000 ft$^2$) | 0 | 0 | 0 |
| Haze % | 4.4 | 4.1 | 3.5 |
| Yellowness Index | 2.22 | 1.11 | 1.58 |
| Brightness Index | 73.08 | 73.88 | 73.72 |
| Intrinsic Viscosity | 0.57 | 0.59 | 0.55 |

As shown above, the multilayered film containing spent liner stock had properties comparable to the other films.

These and other modifications and variations to the present disclosure may be practiced by those of ordinary skill in the art, without departing from the spirit and scope of the present disclosure. In addition, it should be understood that aspects of the various embodiments may be interchanged both in whole or in part. Furthermore, those of ordinary skill in the art will appreciate that the foregoing description is by way of example only, and is not intended to limit the invention

What is claimed:

1. A process for producing a release liner comprising, reducing spent liner stock into chips, the spent liner stock having an intrinsic viscosity;
   increasing the intrinsic viscosity of the liner stock chips to from about 0.58 to about 0.7;
   combining the liner stock with a coloring agent; and
   heating and extruding the liner stock into a film, the film having a release surface configured to function as a release liner for a laminate material.

2. A process as defined in claim 1, wherein the spent liner stock comprises a polyethylene terephthalate polymer.

3. A process as defined in claim 1, wherein the coloring agent comprises a green or blue coloring agent for producing a green colored film.

4. A process as defined in claim 1, wherein the film has a yellowness index of less than about 1.25.

5. A process as defined in claim 1, wherein the intrinsic viscosity of the spent liner stock chips is increased through solid state polymerization.

6. A process as defined in claim 1, wherein the intrinsic viscosity of the spent liner stock chips is increased to from about 0.6 to about 0.64.

7. A process as defined in claim 1, further comprising the step of laminating the film to a laminate material.

8. A process as defined in claim 7, wherein the laminate material comprises a label.

9. A process as defined in claim 1, wherein the extruded film comprises a multilayered film, the multilayered film including at least a middle layer positioned in between a first outer layer and a second outer layer, the liner stock being completely contained within the middle layer.

10. A process as defined in claim 9, wherein the layers of the film are coextruded.

11. A process as defined in claim 9, wherein the first outer layer and the second outer layer contain virgin polyethylene terephthalate polymer.

12. A process as defined in claim 11, wherein the middle layer comprises the liner stock combined with virgin polyethylene terephthalate polymer.

13. A process as defined in claim 12, wherein at least 1% by weight of the middle layer comprises the liner stock.

14. A process as defined in claim 1, wherein the coloring agent comprises a pigment dispersion and is contained within the film in an amount less than about 1% by weight.

15. A process as defined in claim 1, wherein the release surface on the film is formed by applying a release coating to the film.

16. A process as defined in claim 15, wherein the release coating comprises a silicone coating.

17. A process as defined in claim 13, wherein the first outer layer and the second outer layer each comprise from about 5% to about 15% by weight of the coextruded film, the middle layer comprising from about 70% to about 90% by weight of the coextruded film, the middle layer containing the liner stock in an amount of from about 1% to about 100% by weight.

18. A process as defined in claim 1, wherein the intrinsic viscosity of the spent liner stock chips is increased to from about 0.61 to about 0.63.

19. A process as defined in claim 1, wherein the spent liner stock comprises a polyester polymer and wherein the intrinsic viscosity of the liner stock is increased by incorporating a chain extender into the polyester polymer.

20. A process as defined in claim 1, further comprising a step of biaxially stretching the film during formation of the film.

21. A process as defined in claim 1, further comprising the step of pelletizing the spent liner stock prior to increasing the intrinsic viscosity of the liner stock chips.

22. A process for producing a release liner comprising:
reducing spent liner stock into chips, the spent liner stock having an intrinsic viscosity;
increasing the intrinsic viscosity of the liner stock chips through solid state polymerization;
combining the liner stock with a coloring agent; and
heating and extruding the liner stock into a film, the film having a release surface configured to function as a release liner for a laminate material.

23. A process as defined in claim 22, wherein the intrinsic viscosity of the liner stock chips is increased to from about 0.58 to about 0.7.

24. A process as defined in claim 22, wherein the spent liner stock comprises a polyethylene terephthalate polymer.

25. A process as defined in claim 22, wherein the extruded film comprises a multilayered film, the multilayered film including at least a middle layer positioned in between a first outer layer and a second outer layer, the liner stock being completely contained within the middle layer.

* * * * *